United States Patent
Aoki et al.

(10) Patent No.: US 10,749,416 B2
(45) Date of Patent: Aug. 18, 2020

(54) METHOD FOR MANUFACTURING CORE PLATE

(71) Applicants: DENSO CORPORATION, Kariya, Aichi-pref. (JP); NIPPON STEEL & SUMITOMO METAL CORPORATION, Chiyoda-ku, Tokyo (JP)

(72) Inventors: Tetsuya Aoki, Kariya (JP); Takeshi Senoo, Kariya (JP); Keiichi Okazaki, Kariya (JP); Satoshi Doi, Kariya (JP); Hiroshi Fujimura, Chiyoda-ku (JP); Hiroaki Sato, Chiyoda-ku (JP)

(73) Assignees: DENSO CORPORATION, Kariya, Aichi-pref. (JP); NIPPON STEEL & SUMITOMO METAL CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 16/250,025

(22) Filed: Jan. 17, 2019

(65) Prior Publication Data

US 2019/0149021 A1 May 16, 2019

Related U.S. Application Data

(63) Continuation of application No. PCT/JP2017/025915, filed on Jul. 18, 2017.

(30) Foreign Application Priority Data

Jul. 21, 2016 (JP) .................................. 2016-143361
May 30, 2017 (JP) .................................. 2017-107106

(51) Int. Cl.
*H02K 15/02* (2006.01)
*C21D 10/00* (2006.01)
(Continued)

(52) U.S. Cl.
CPC ............. *H02K 15/02* (2013.01); *B21D 11/08* (2013.01); *B21D 11/203* (2013.01); *B21D 28/02* (2013.01);
(Continued)

(58) Field of Classification Search
CPC ........ H02K 15/02; C21D 8/12; C21D 8/1244; C21D 2261/00; C21D 2221/02;
(Continued)

(56) References Cited

U.S. PATENT DOCUMENTS

2009/0077789 A1* 3/2009 Tokizawa ............. B21D 11/085
29/596
2014/0091671 A1 4/2014 Irie

FOREIGN PATENT DOCUMENTS

JP H07298570 A 11/1995
JP H08251845 A 9/1996
(Continued)

*Primary Examiner* — Anthony J Zimmer
*Assistant Examiner* — Ricardo D Morales
(74) *Attorney, Agent, or Firm* — Harness, Dickey & Pierce, P.L.C.

(57) ABSTRACT

A method is for manufacturing a core plate having an annular core back and teeth extending from the core back toward the center. The core plate is obtained by performing a punching step, a winding step, a straining step and an annealing step. At the straining step, compressive strain is applied to the core back or the band-shaped core back that is to be the core back after winding. At the annealing step, the core back or the band-shaped core back is annealed to be recrystallized after the applying of strain.

9 Claims, 10 Drawing Sheets

(51) Int. Cl.
    *H02K 1/02*     (2006.01)
    *C21D 7/06*     (2006.01)
    *B21D 28/02*     (2006.01)
    *C21D 8/12*     (2006.01)
    *B21D 11/20*     (2006.01)
    *C21D 7/04*     (2006.01)
    *H01F 41/02*     (2006.01)
    *B21D 11/08*     (2006.01)
    *B21D 53/16*     (2006.01)
    *C22C 38/00*     (2006.01)
    *B21D 28/26*     (2006.01)
    *C21D 9/00*     (2006.01)
    *C22C 38/02*     (2006.01)

(52) U.S. Cl.
    CPC .............. *B21D 28/26* (2013.01); *B21D 53/16* (2013.01); *C21D 7/04* (2013.01); *C21D 7/06* (2013.01); *C21D 8/12* (2013.01); *C21D 8/1244* (2013.01); *C21D 8/1272* (2013.01); *C21D 9/0068* (2013.01); *C21D 10/005* (2013.01); *C22C 38/00* (2013.01); *H01F 41/0233* (2013.01); *H02K 1/02* (2013.01); *C21D 2221/02* (2013.01); *C21D 2261/00* (2013.01); *C22C 38/02* (2013.01)

(58) Field of Classification Search
    CPC ........ C21D 10/00; B21D 17/00; B21D 17/04; B21D 22/04; B21D 26/00; B21D 28/02; B21D 5/00; B21D 11/20; B21D 11/203; B21D 11/206; B21D 28/00; H01F 3/04
    See application file for complete search history.

(56) References Cited

FOREIGN PATENT DOCUMENTS

| | | |
|---|---|---|
| JP | H09092521 A | 4/1997 |
| JP | H09092561 A | 4/1997 |
| JP | 2006199999 A | 8/2006 |
| JP | 2006254645 A | 9/2006 |
| JP | 2009-077561 A | 4/2009 |
| JP | 2014193000 A | 10/2014 |
| JP | 2015122893 A | 7/2015 |
| JP | 2016094655 A * | 5/2016 |

* cited by examiner

METHOD FOR MANUFACTURING CORE PLATE

CROSS REFERENCE TO RELATED APPLICATIONS

The present application is a continuation application of International Patent Application No. PCT/JP2017/025915 filed on Jul. 18, 2017, which designated the United States and claims the benefit of priority from Japanese Patent Applications No. 2016-143361 filed on Jul. 21, 2016, and No. 2017-107106 filed on May 30, 2017. The entire disclosures of all of the above applications are incorporated herein by reference.

TECHNICAL FIELD

The present disclosure relates to a method for manufacturing a core plate.

BACKGROUND

A stator core used in a rotating electric machine such as a generator and a motor includes multiple annular core plates which are laminated and each has an annular core back and teeth.

SUMMARY

At least one embodiment of the present disclosure is a method for manufacturing a core plate having an annular core back and multiple teeth extending from the core back toward the center. The manufacturing method includes a punching step, a winding step, a straining step, and an annealing step. In the punching step, a core sheet strip is punched out from a grain-oriented electrical steel sheet which has an easy magnetization direction in a single direction on a sheet surface. The core sheet strip includes a band-shaped core back extending in a direction perpendicular to the easy magnetization direction, and parallel teeth extending parallel to the easy magnetization direction from the band-shaped core back. In the winding step, the core sheet strip is wound into an annular shape with the parallel teeth facing inward for obtaining the core plate having the core back and the teeth. In the straining step, compressive strain in a plate thickness direction is applied to the band-shaped core back of the core sheet strip or the core back of the core plate. In the annealing step, the band-shaped core back or the core back is annealed to be recrystallized after the applying of strain.

DETAILED DESCRIPTION

Figure 1A:
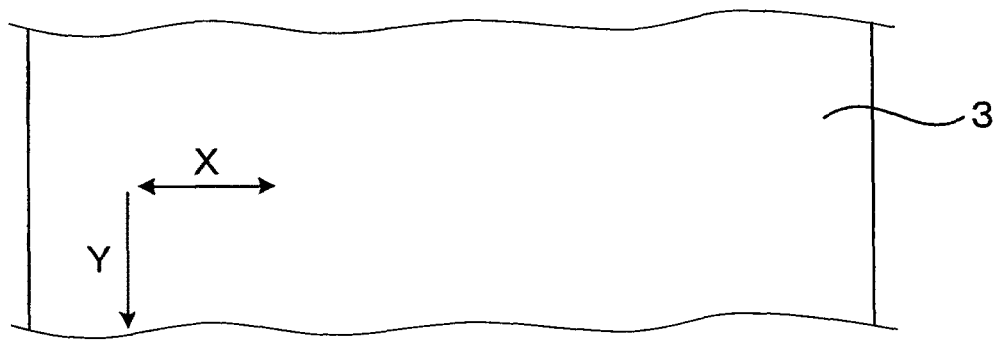
FIG. 1A is a view illustrating a grain-oriented electrical steel sheet according to at least one embodiment.

Hereinafter, embodiments for implementing the present disclosure will be described referring to drawings. In each embodiment, portions corresponding to the elements described in the preceding embodiments are denoted by the same reference numerals, and redundant explanation may be omitted. In each of the embodiments, when only a part of the configuration is described, the other parts of the configuration can be applied to the other embodiments described above. The parts may be combined even if it is not explicitly described that the parts can be combined. The embodiments may be partially combined even if it is not explicitly described that the embodiments can be combined, provided there is no harm in the combination.

First Embodiment

An embodiment of a method for manufacturing a core plate will be described referring to FIGS. 1A to 3. In the present embodiment, a core plate 1 is manufactured by, after performing a punching step, performing a straining step, a winding step and an annealing step. The core plate 1 includes, as exemplified in FIG. 1E, a circular annular core back 11 and teeth 12 extending from the core back 11 toward its center O.

In the present embodiment, a manufacturing of a core plate will be described, in which the punching step, the straining step, the winding step and the annealing step are sequentially performed. The outline of each step will be described below.

Figure 1B:
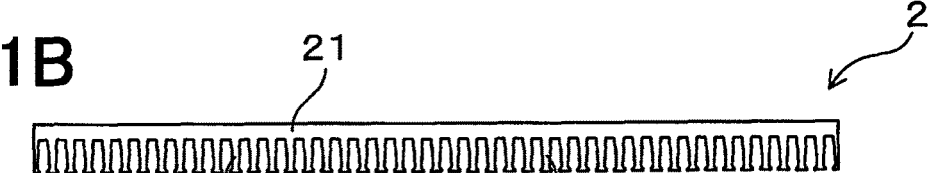
FIG. 1B is a view illustrating a core sheet strip according to at least one embodiment.
Figure 1C:
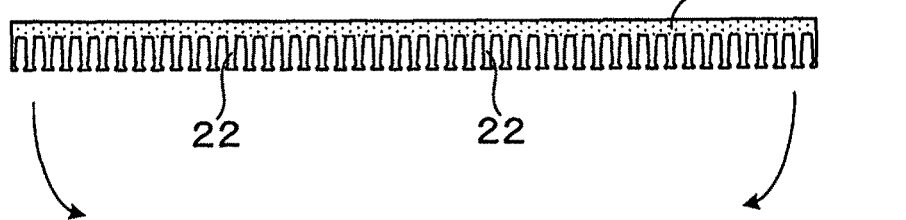
FIG. 1C is a view illustrating a core sheet strip having compressive strain in a band-shaped core back according to at least one embodiment.

As shown in FIGS. 1A and 1B, at the punching step, a core sheet strip 2 including a band-shaped core back 21 and parallel teeth 22 is punched out from a grain-oriented electrical steel sheet 3. The band-shaped core back 21 extends in an easy magnetization direction Y and a perpendicular direction X, and the parallel teeth 22 extends parallel to the easy magnetization direction Y. At the straining step, as illustrated in FIG. 1C, compressive strain in a plate thickness direction Z is applied to the band-shaped core back 21 of the core sheet strip 2. In FIGS. 1A to 1E and FIGS. 4A to 6D described later, the direction perpendicular to the drawing surface is defined as the plate thickness direction.

Figure 1D:
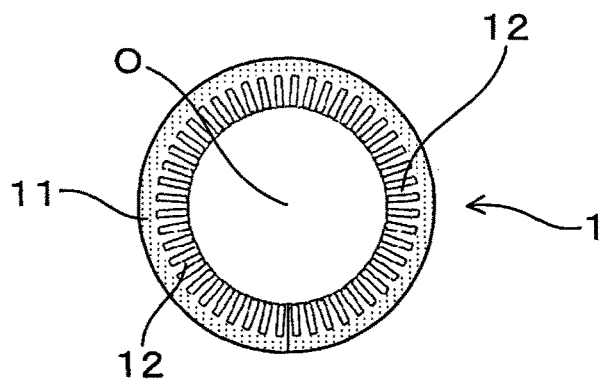
FIG. 1D is a view illustrating a core plate having compressive strain in a core back according to at least one embodiment.

As illustrated in FIGS. 1C and 1D, at the winding step, the core plate 1 having the core back 11 and the teeth 12 is obtained by winding the core sheet strip 2 into an annular shape with the parallel teeth 22 facing inward. At the annealing step, the core back 11 is recrystallized by annealing. The detail of each step will be described below.

As shown in FIGS. 1A and 1B, at the punching step, the core sheet strip 2 including the band-shaped core back 21 and the parallel teeth 22 is punched out from the grain-oriented electrical steel sheet 3. The grain-oriented electrical steel sheet 3 has an easy magnetization direction Y in a single direction on its sheet surface. That is, the grain-oriented electrical steel sheet 3 is a plate-shaped electrical steel sheet in which the easy magnetization direction Y is aligned in one of in-plane directions of the electrical steel sheet. The in-plane directions are perpendicular to a thickness direction of the electrical steel sheet. As the grain-oriented electrical steel sheet 3, a commercially available product can be used, and, for example, 23ZH85 manufactured by Nippon Steel & Sumitomo Metal Corporation can be used. Normally, the easy magnetization direction Y of the grain-oriented electrical steel sheet 3 is parallel to the rolling direction.

At the punching step, the band-shaped core back 21 is punched out so as to extend in the easy magnetization direction Y and the perpendicular direction X of the grain-oriented electrical steel sheet 3. Therefore, the longitudinal direction of the band-shaped core back 21 is parallel to the perpendicular direction X which is perpendicular to the easy magnetization direction Y. On the other hand, the parallel teeth 22 are punched out so as to extend parallel to the easy magnetization direction Y of the grain-oriented electrical steel sheet 3. The core sheet strip 2 has a comb shape as illustrated in FIG. 1B, and the parallel teeth 22 are formed into comb teeth shapes.

In the present specification, the vertical direction includes not only a direction of 90° but also a direction close to 90° in appearance. This also applies to the parallel direction, which includes not only a direction of 180° or 360° but also a direction close to 180° or 360° in appearance.

Next, at the straining step, as illustrated in FIG. 1C, compressive strain is applied to the band-shaped core back 21 in the core sheet strip 2. In FIG. 1C, a region to which compressive strain has been applied is indicated by dot hatching. Also in the following drawings, dot hatching indicates a region to which compressive strain is applied. At the straining step, compressive strain can be partially applied to the band-shaped core back 21, but it is preferable to apply compressive strain to the entire band-shaped core back 21.

The method of applying compressive strain at the straining step is not particularly limited, and various compression methods capable of applying compressive strain to the band-shaped core back 21 can be used. Compressive strain may be either compressive plastic strain or compressive elastic strain, but compressive plastic strain is preferable from the viewpoint that recrystallization at annealing step becomes easier.

As a compressing method, shot peening, water jet peening, laser peening, ultrasonic peening, forging, or roller flattening is preferable. In this case, compression plastic strain is easily applied, and recrystallization at the annealing step becomes easier. Shot peening, water jet peening, laser peening, and ultrasonic peening are more preferable from the viewpoint that control of a processing region is relatively easy and compressive plastic strain can be prevented from being applied to a region other than the band-shaped core back 21, for example, the parallel teeth 22. On the other hand, forging and roller flattening are more preferable from the viewpoint that the compressive plastic strain can be sufficiently applied, the easy magnetization direction in the core back tends to be more random, and thus the magnetic properties can be further improved.

Figure 2:
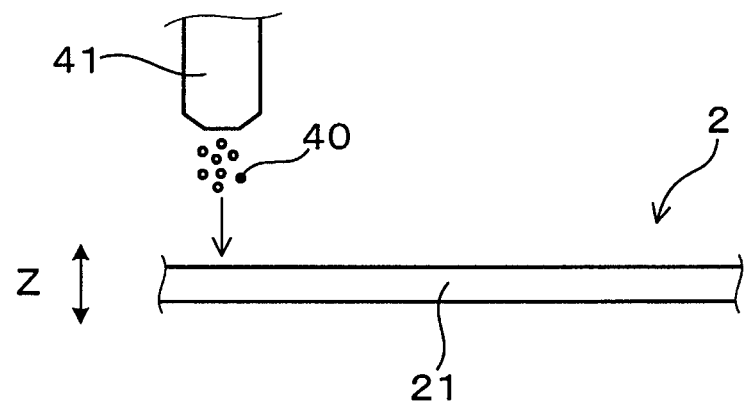
FIG. 2 is an explanatory view illustrating a straining step by shot peening according to at least one embodiment.

As shown in FIG. 2, when compressive strain is applied by shot peening, an injection material 40 called a shot is injected from an injection nozzle 41 of a shot peening apparatus to the band-shaped core back 21 of the core sheet strip 2. The injection direction is parallel to the plate thickness direction Z of the core sheet strip 2. As a result, compressive strain is applied to the band-shaped core back 21 of the core sheet strip 2.

Next, a winding step can be performed. Two arrows stretching downward from both ends in FIG. 1C indicate a winding direction at the winding step. As illustrated in FIGS. 1C and 1D, at the winding step, the core sheet strip 2 is wound into an annular shape with the parallel teeth 22 facing inward. Since the core sheet strip 2 is curled in the directions of the arrows shown in FIG. 1C, the winding process can also be called a curling process.

At the winding step, the band-shaped core back 21 forms a circular annular core back 11, and the parallel teeth 22 forms teeth 12. Accordingly, the extending directions of the teeth 12 are changed toward the center O of the circular annular core back 11.

In the present embodiment, since the straining step has already been performed before the winding step, the core plate 1 obtained after the winding step has compressive strain in the core back 11.

Figure 1E:
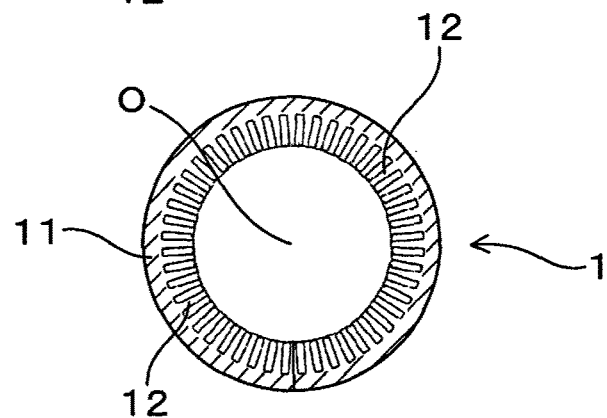
FIG. 1E is a view illustrating a core plate having a recrystallized region in a core back according to at least one embodiment.

Next, an annealing step can be performed. In FIG. 1E, the recrystallized region is indicated by oblique hatching. Oblique hatchings in the following drawings also indicate recrystallized regions.

At the annealing step, the core plate 1 is heated. As a result, as shown in FIG. 1E, recrystallization occurs in the core back 11 to which compressive strain has been applied. Then, by the recrystallization, the easy magnetization directions are disordered, and the easy magnetization directions in the core back 1 can be set to be random (see FIG. 3). The dash arrows in FIG. 3 indicate easy magnetization directions in respective portions of the core plate. This also applies to FIGS. 8 and 10 described later.

In the core back 11 to which compressive strain has been applied, recrystallization easily occurs at the annealing step. Therefore, recrystallization with low temperature and short time annealing is possible. At the annealing step, recrystallization does not occur in a region other than the core back 11, for example, the teeth 12 to which no compressive strain has been applied, and annealing can be performed at temperature at which recrystallization occurs in the core back 11 to which compressive strain has been applied.

The heating temperature at the annealing step can be appropriately adjusted depending on the composition of the material, the degree of strain and the like, for example, can be adjusted at 700 to 1100° C. In the core back 11 to which compressive strain has been applied, recrystallization easily occurs as described above. Therefore, the recrystallization can be performed even at a low temperature, for example, about 700° C. The heating temperature at the annealing step is preferably from 700 to 850° C., more preferably from 700 to 800° C., from the viewpoint of more reliable suppressing of recrystallization in the region other than the core back 11 and from the viewpoint of more suppressing of oxidation of the material.

The holding time at the above-described heating temperature at the annealing step, that is, the heating holding time can be appropriately adjusted depending on plasticity of the material, the degree of strain, productivity, and the like, for example, can be set at 1 second to 2 hours. In the core back 11 to which compressive strain has been applied, recrystallization easily occurs as described above. Therefore, the annealing can be performed with a short heating holding time of, for example, 10 seconds or less. From the viewpoint of improvement of productivity and suppressing of oxidation of the material, it is preferable that the heating holding time at the annealing step is set as short as possible, preferably 600 seconds or less. From the viewpoint that the core back 11 can be sufficiently recrystallized even at a low temperature of about 700 to 800° C., the heating holding time is preferably 5 seconds or more, and more preferably 10 seconds or more.

Figure 3:
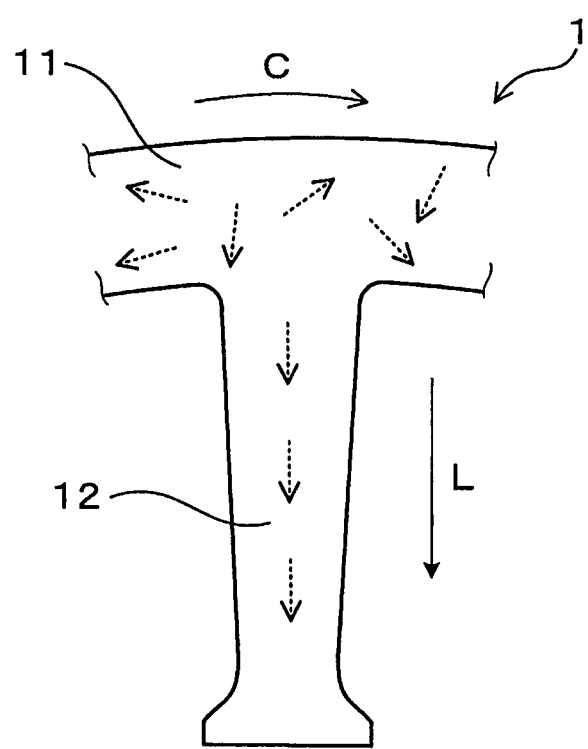
FIG. 3 is an enlarged view illustrating easy magnetization directions in a core plate according to at least one embodiment.

Next, operation of the present embodiment will be described. In the manufacturing method of the present embodiment, as illustrated in FIGS. 1A to 1E, parallel teeth 22 extending parallel to the easy magnetization direction Y of the grain-oriented electrical steel sheet 3 is formed, and then a core sheet strip 2 is wound annularly with the parallel teeth 22 facing inward. Therefore, in the teeth 12 of the core plate 1 obtained by the above manufacturing method, as shown in FIG. 3, the easy magnetization directions can be aligned in the extension direction L of the teeth 12, that is, in the direction toward the center O of the circular annular core plate 1. As a result, the magnetic properties of the teeth 12 can be enhanced.

Figure 8:
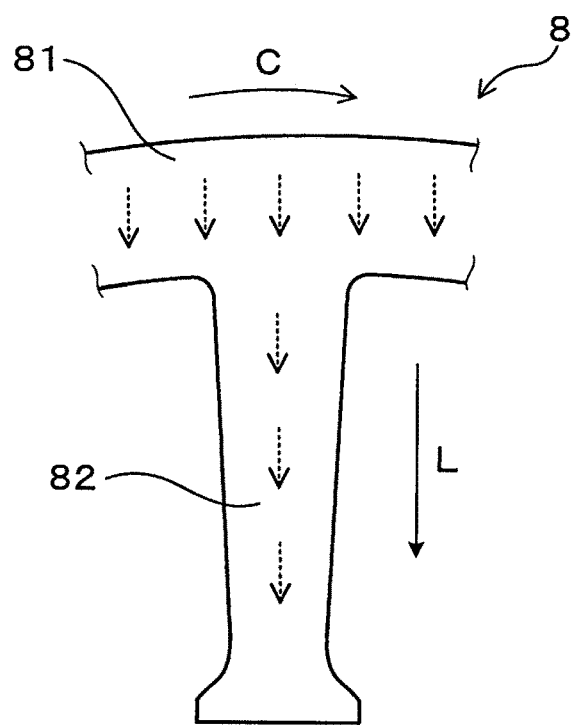
FIG. 8 is an enlarged view illustrating easy magnetization directions in a core plate according to at least one embodiment.

At the annealing step, the core back 11 is recrystallized. Therefore, as illustrated in FIG. 3, the easy magnetization directions Y in the core back 11 can be set to be random. Therefore, despite the fact that it was manufactured using the grain-oriented electrical steel sheet, it is possible to prevent the core plate 1 from becoming like a core plate 8 exemplified in a first comparative embodiment described later, which is shown in FIG. 8. In the core plate 8, the easy magnetization directions in a core back 81 are parallel to an extension direction L of teeth 82, that is, a direction from the core back 81 toward the center O. The desired direction of the easy magnetization direction in the core back is along the circumferential direction of the annular core back. Therefore, the easy magnetization direction orthogonal to the circumferential direction C in the core back 81, that is, parallel to the extension direction L of the teeth 12 is unfavorable from the viewpoint of magnetic properties because a hard magnetization direction is along the circumferential direction C of the core back 81.

In the manufacturing method of the present embodiment, as illustrated in FIG. 3, the easy magnetization directions in the core back 11 can be set to be random. Therefore, the easy magnetization directions parallel to the extension direction L of the teeth can be reduced in the core back 11. As a result, deterioration of the magnetic properties of the core back 11 can be prevented while enhancing the magnetic properties of the teeth 12.

In the manufacturing method described above, the core back 11 has undergone recrystallization by annealing after being applied compressive strain. Therefore, recrystallization easily occurs at the time of annealing, and recrystallization at low temperature and in a short time becomes possible. Therefore, at the annealing step, the core back 11 of the core plate 1 does not need to be partially heated, and thus the entire core plate 1 including the core back can be heated. That is, at the annealing step, although the core plate 1 is heated, the core back 11 can be selectively recrystallized while preventing recrystallization of the teeth 12.

In the manufacturing method of the present embodiment, the respective steps after the punching step is in no particular order as long as the annealing step is carried out after the straining step, and the order can be changed. For example, as in the present embodiment, it is possible to perform the punching step, the straining step, the winding step, and the annealing step in this order. It is also possible to perform the punching step, the winding step, the straining step, and the annealing step in this order. It is also possible to perform the punching step, the straining step, the annealing step, and the winding step in this order. Embodiments in which the order of the respective steps after the punching step is changed will be described in a second embodiment and a third embodiment. Further, as exemplified in a later-described sixth embodiment, the straining step and the winding step may be carried out at the same time.

The annealing step is preferably performed at the final step of the respective steps. In this case, the annealing can eliminate not only the compressive strain in the thickness direction applied at the straining step but also strain in the in-plane direction which can occur, for example, at the winding step. Therefore, deterioration of iron loss can be prevented.

In the case where the straining step is carried out before the winding step as in the present embodiment, compressive strain can be applied to the core sheet strip 2 made of a homogeneous material having no heterogeneous processing strain which can be applied at the winding step. Therefore, at the straining step, compressive strain in the plate thickness direction Z can be uniformly applied to the entire material of the band-shaped core back 21 of the core sheet strip 2. In addition, in this case, compressive strain can be applied, by compressing, to the band-shaped core back 21 extending in one straight direction. Therefore, compression processing can be easily performed, and options of the compression processing method can be improved.

As described above, according to the manufacturing method of the present embodiment, the core plate 1 having the teeth 12 where the easy magnetization directions are along the extension direction L of the teeth 12 and the core back 11 where the easy magnetization directions are random can be obtained. Therefore, according to the manufacturing method of the core plate 1, the magnetic properties in the teeth 12 can be improved, and at the same time, deterioration of magnetic properties in the core back 11 can be prevented. That is, the core plate 1 can exhibit high magnetic flux density in both the core back 11 and the teeth 12. Therefore, the core plate 1 is suitable for, for example, a stator core of a rotating electric machine.

Second Embodiment

In a present embodiment, a core plate is manufactured by, after a punching step, sequentially performing a winding step, a straining step and an annealing step. Those of reference numerals used in the second and subsequent embodiments which are the same reference numerals as those used in the above-described embodiments denote the same components as in the previous embodiments unless otherwise indicated.

Figure 4A:
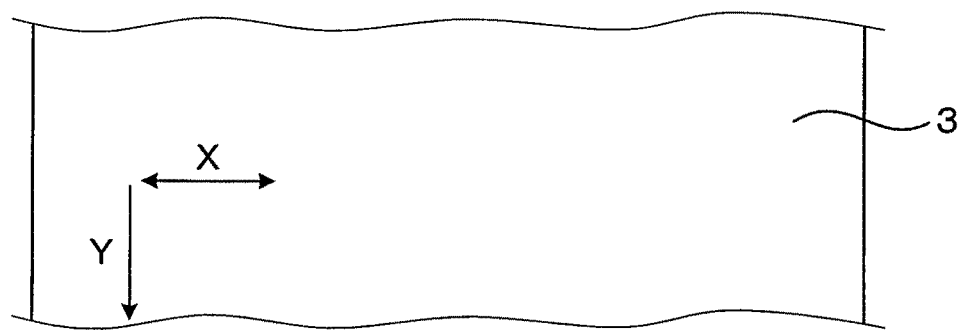
FIG. 4A is a view illustrating a grain-oriented electrical steel sheet according to at least one embodiment.
Figure 4B:
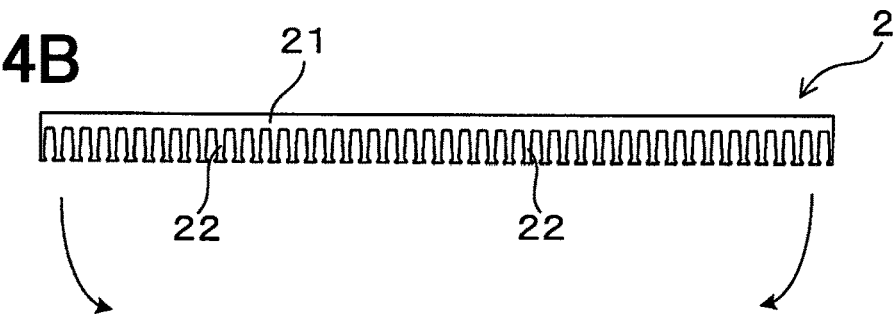
FIG. 4B is a view illustrating a core sheet strip according to at least one embodiment.
Figure 4C:
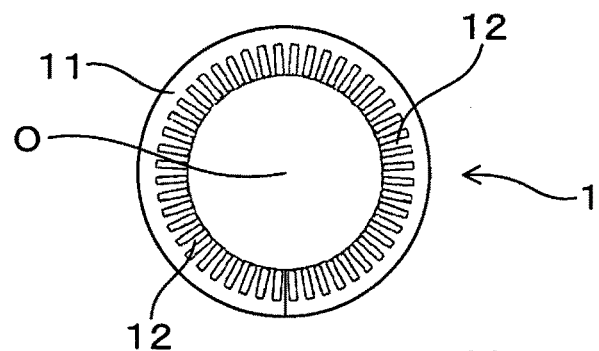
FIG. 4C is a view illustrating a core plate according to at least one embodiment.

As shown in FIGS. 4A and 4B, a core sheet strip 2 including a band-shaped core back 21 and a parallel teeth 22 is obtained by performing a punching step of a grain-oriented electrical steel sheet 3 similar to the first embodiment. Next, the winding step is performed, and as illustrated in FIGS. 4B and 4C, the core sheet strip 2 is wound into an annular shape with parallel teeth 22 facing inward. Accordingly, a core plate 1 having a core back 11 and teeth 12 is obtained.

Figure 4D:
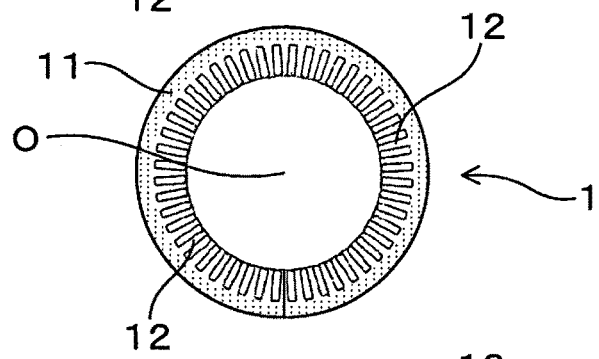
FIG. 4D is a view illustrating a core plate having compressive strain in a core back according to at least one embodiment.
Figure 4E:
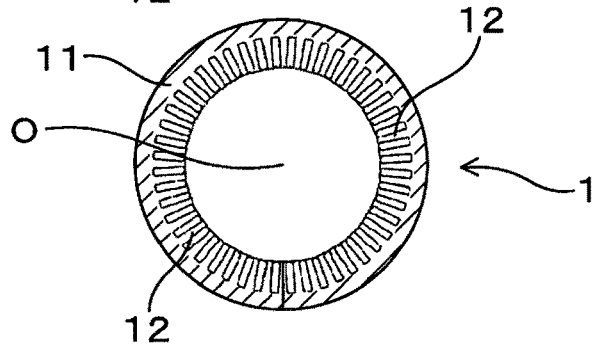
FIG. 4E is a view illustrating a core plate having a recrystallized region in a core back according to at least one embodiment.
Figure 5A:
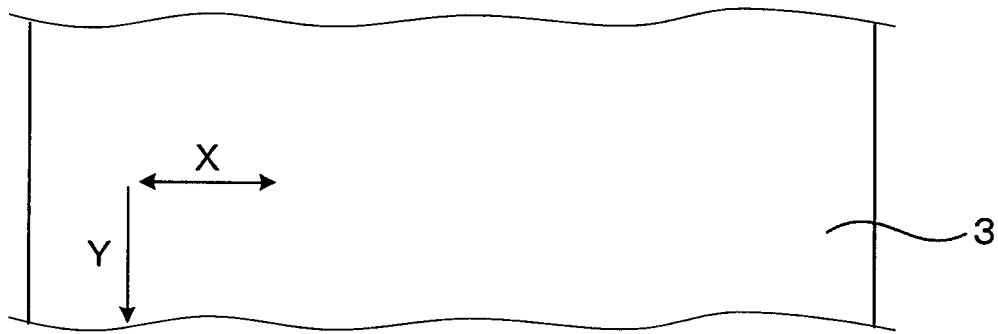
FIG. 5A is a view illustrating a grain-oriented electrical steel sheet according to at least one embodiment.
Figure 5B:
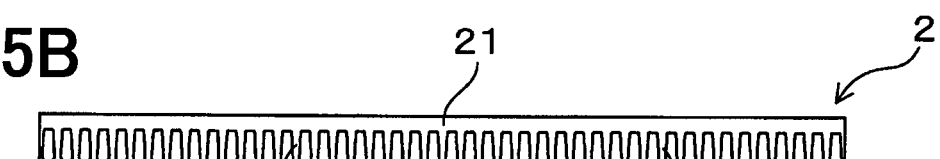
FIG. 5B is a view illustrating a core sheet strip according to at least one embodiment.
Figure 5C:
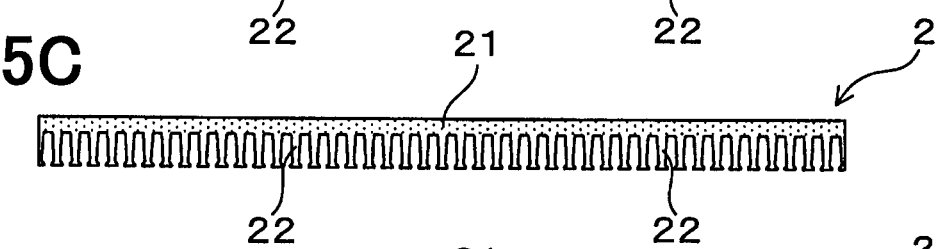
FIG. 5C is a view illustrating a core sheet strip having compressive strain in a band-shaped core back according to at least one embodiment.

Next, the straining step is performed to apply compressive strain in a plate thickness direction to the core back 11 of the core plate 1 as illustrated in FIG. 4D. Next, the annealing step is performed to recrystallize the core back 11 by annealing as illustrated in FIG. 5E. Accordingly, the core plate 1 similar to that in the first embodiment can be obtained.

Specifically, each step can be carried out in the same manner as in the first embodiment. As in the present embodiment, by performing the winding step before the straining step, compressive strain in the thickness direction is applied to the core back 11 which has been elongated in the circumferential direction by the winding processing. Therefore, the winding processing can be performed without strain to be applied at the straining step. Therefore, the winding processing can be performed by low processing stress. Further, dimensional accuracy of the winding processing can be improved. In addition, the similar operational effects to those of the first embodiment can be obtained.

Third Embodiment

In a present embodiment, a core plate is manufactured by, after a punching step, sequentially performing a straining step, an annealing step, and a winding step. First, as shown in FIGS. 5A and 5B, the punching step similarly to the first embodiment is performed to produce a core sheet strip 2 from a grain-oriented electrical steel sheet 3, and then the straining step similarly to the first embodiment is performed to apply compressive strain to a band-shaped core back 21 of the core sheet strip 2, as illustrated in FIG. 5C.

Figure 5D:
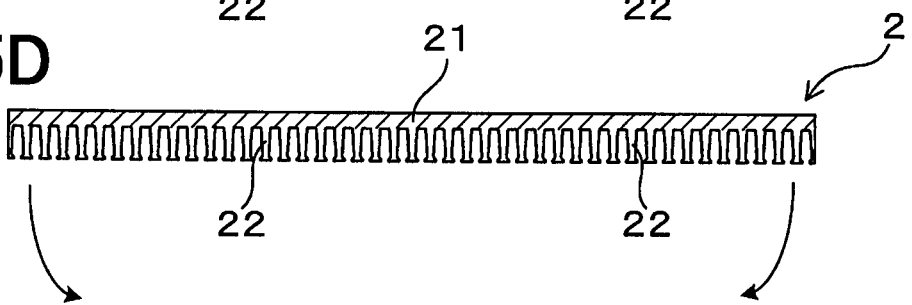
FIG. 5D is a view illustrating a core sheet strip having a recrystallized region in a core back according to at least one embodiment.
Figure 5E:
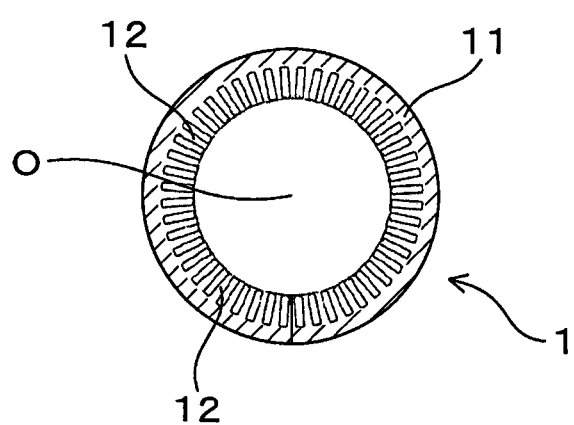
FIG. 5E is a view illustrating a core plate having a recrystallized region, according to at least one embodiment according to at least one embodiment.

Next, the annealing step is performed to recrystallize the band-shaped core back 21 of the core sheet strip 2 as illustrated in FIG. 5D. Next, as illustrated in FIGS. 5D and 5E, the core sheet strip 2 is wound into an annular shape with parallel teeth 22 facing inward. Accordingly, a core plate 1 having a core back 11 and teeth 12 is obtained. Therefore, the core plate 1 similar to that in the first embodiment can be obtained.

Specifically, each step can be carried out in the same manner as in the first embodiment. The annealing step is performed before the winding step in the present embodiment, and thus the recrystallized grains obtained at the annealing step can be controlled to be fine grains having a grain size of, for example, 500 μm or less. As a result, as illustrated in FIGS. 5D and 5E, elongation deformation in the band-shaped core back 21 is likely to occur during winding processing, and workability is improved. Therefore, the band-shaped core back 21 can be deformed into a desired shape such as a circular annular shape. Further, shrinkage deformation that can occur at the annealing step is corrected by winding processing, and therefore dimensional accuracy of the core plate 1 can be improved. In addition, the similar operational effects to those of the first embodiment can be obtained.

Fourth Embodiment

In a present embodiment, a core plate 1 is manufactured by, after a straining step, sequentially performing a punching step, a winding step and an annealing step. The respective steps after the straining step is in no particular order as long as the winding step is carried out after the punching step, and the order can be changed. Hereinafter, an embodiment will be described, in which the straining step, the punching step, the winding step, and the annealing step are performed in this order.

Figure 6A:
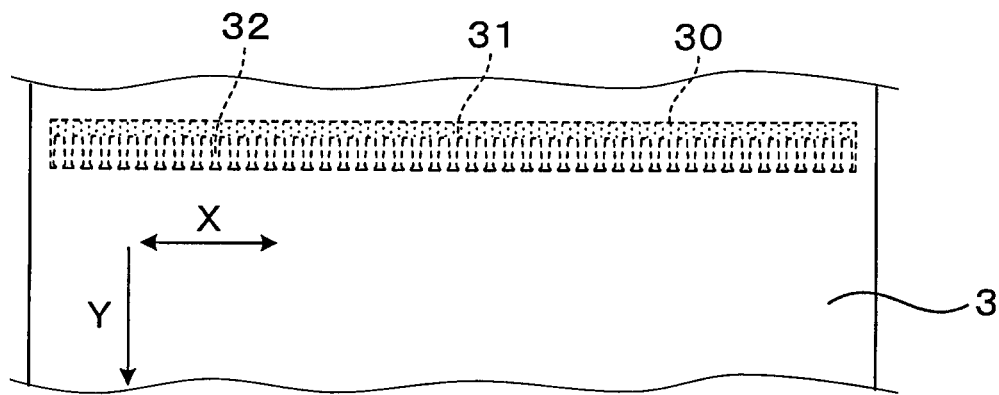
FIG. 6A is a view illustrating a grain-oriented electrical steel sheet having compressive strain in a core-back region according to at least one embodiment.

First, as shown in FIG. 6A, first, a band-shaped core-back region 31 is predetermined in a grain-oriented electrical steel sheet 3. The band-shaped core-back region 31 has the same shape as the band-shaped core back 21 of the core sheet strip 2 obtained after the punching step, but is an imagined region on the grain-oriented electrical steel sheet 3 before the punching step is actually performed. In other words, the band-shaped core-back region 31 can be said to be like a design drawing on the grain-oriented electrical steel sheet 3.

At the time of predetermination of the band-shaped core-back region 31, a parallel teeth region 32 can be predetermined, which becomes the parallel teeth 22 by the punching process, and a core sheet strip region 30 can be also predetermined, which becomes the core sheet strip 2 by the punching process. At least the band-shaped core-back region 31 extending in an easy magnetization direction Y and a perpendicular direction X in the grain-oriented electrical steel sheet 3 has to be predetermined.

Figure 6B:
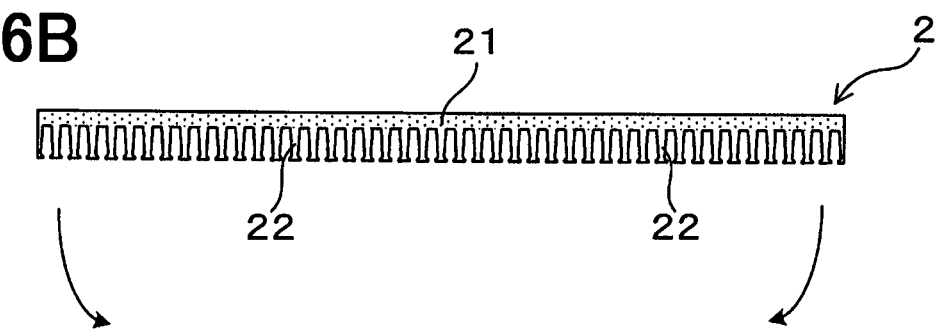
FIG. 6B is a view illustrating a core sheet strip having a compressive strain in a band-shaped core back according to at least one embodiment.

At the straining step, as illustrated in FIG. 6A, compressive strain in a plate thickness direction Z is applied to the band-shaped core-back region 31 of the grain-oriented electrical steel sheet 3. Next, as illustrated in FIG. 6B, the punching step is performed to obtain the core sheet strip 2 including the band-shaped core back 21 and the parallel teeth 22. The punching is performed so that the band-shaped core back 21 is formed from the predetermined band-shaped core-back region 31. That is, the band-shaped core back 21 is formed by punching from the band-shaped core-back region 31 present in the grain-oriented electrical steel sheet 3. The core sheet strip 2 obtained in this way has the band-shaped core back 21 to which compressive strain has already been applied.

Figure 6C:
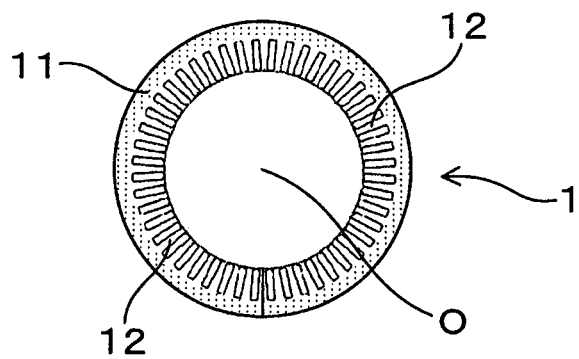
FIG. 6C is a view illustrating a core plate having compressive strain in a core back according to at least one embodiment.

Next, the winding step is performed, and as illustrated in FIG. 6B the core sheet strip 2 is wound into an annular shape with parallel teeth 22 facing inward. Accordingly, as illustrated in FIG. 6C, a core plate 1 having a core back 11 and teeth 12 is obtained. The core plate 1 has compressive strain in the core back 11.

Figure 6D:
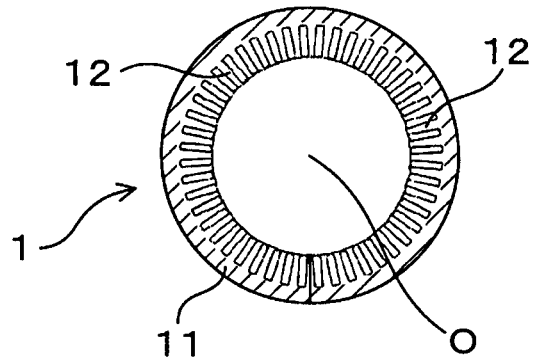
FIG. 6D is a view illustrating a core plate having a recrystallized region in a core back according to at least one embodiment.

Next, the annealing step is performed to recrystallize the core back 11 by annealing as illustrated in FIG. 6D. Therefore, the core plate 1 similar to that in the first embodiment can be obtained.

Specifically, each step can be carried out in the same manner as in the first embodiment. In present embodiment, the straining step is performed before the punching step, and therefore the straining step and the punching step can be successively performed by the same press machine by using, for example, a so-called transfer press machine. That is, as illustrated in FIGS. 6A and 6B, application of compressive strain in the thickness direction to the band-shaped core-back region 31 and punching processing of the core sheet strip 2 can be successively performed by automatic processing. Therefore, the straining step and the punching step can be speeded up. In addition, the similar operational effects to those of the first embodiment can be obtained.

In the manufacturing method of the present embodiment, the respective steps after the straining step is in no particular order, and the order can be changed. Although illustration and detailed explanation are omitted, it is also possible to perform the straining step, the punching step, the annealing step, and the winding step in this order. It is also possible to perform the straining step, the annealing step, the punching step, and the winding step in this order.

First Comparative Embodiment

Figure 7A:
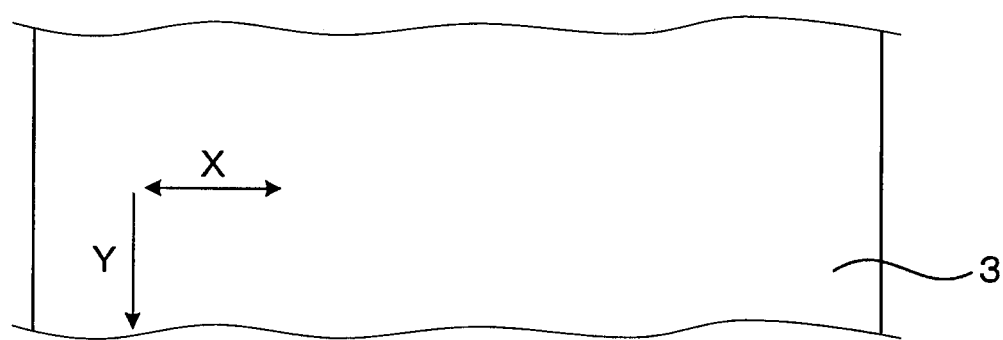
FIG. 7A is a view illustrating a grain-oriented electrical steel sheet according to at least one embodiment.
Figure 7B:
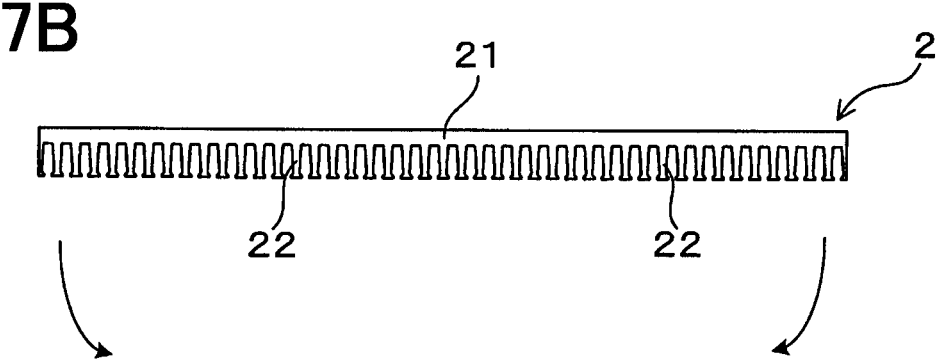
FIG. 7B is a view illustrating a core sheet strip according to at least one embodiment.

In the present embodiment, a core plate having the same shape as that in the first embodiment is manufactured by punching a core sheet strip from a grain-oriented electrical steel sheet and winding the core sheet strip. More specifically, as shown in FIGS. 7A and 7B, a core sheet strip 2 including a band-shaped core back 21 and parallel teeth 22 is prepared from a grain-oriented electrical steel sheet 3 by performing a punching step similar to the first embodiment. The core sheet strip 2 is similar to that of the first embodiment.

Figure 7C:
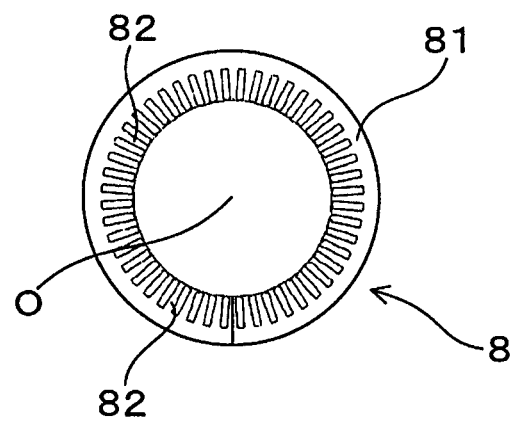
FIG. 7C is a view illustrating a core plate, according to at least one embodiment.

Next, a winding step is performed, and as illustrated in FIG. 7B, the core sheet strip 2 is wound into an annular shape with parallel teeth 22 facing inward. Accordingly, as illustrated in FIG. 7C, a core plate 8 having a core back 81 and teeth 82 is obtained.

In the manufacturing method of the present embodiment, the core back 81 does not undergo a straining step and an annealing step as in the first to fourth embodiments. Therefore, as illustrated in FIG. 8, the easy magnetization direction of the core back 81 and the easy magnetization direction of the teeth 82 are parallel, and both are along the extension direction L of the teeth 82.

In such a core plate 8, since the easy magnetization direction in the teeth 82 is parallel to the desired extension direction L, the magnetic properties are excellent in the teeth 82. But, the easy magnetization direction in the core back 81 is orthogonal to the desired circumferential direction C. That is, the core back 81 becomes difficult to be magnetized in a magnetic circuit, which is not preferable from the viewpoint of magnetic properties.

Second Comparative Embodiment

Figure 9A:
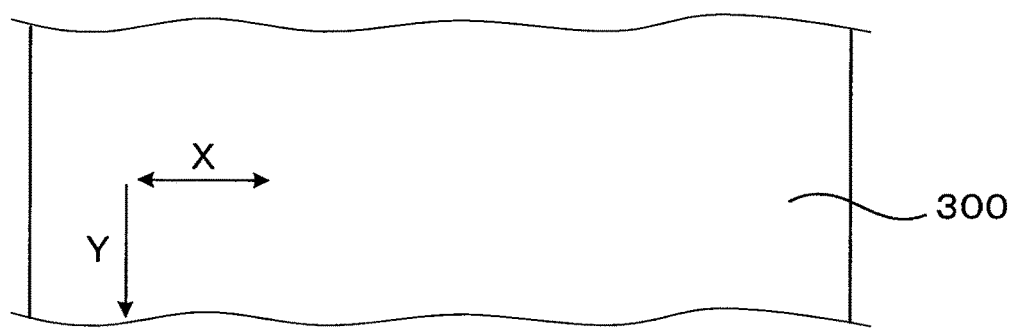
FIG. 9A is a view illustrating a grain-oriented electrical steel sheet according to at least one embodiment.
Figure 9B:
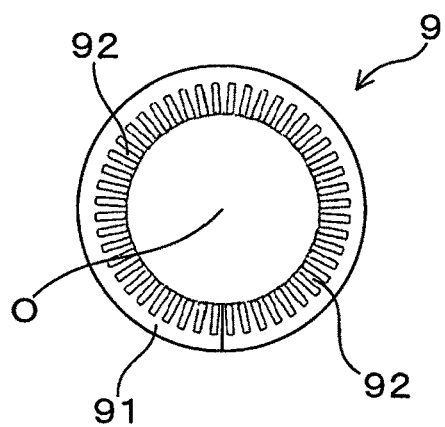
FIG. 9B is a view illustrating a core plate, according to at least one embodiment.

In the present embodiment, a core plate having the same shape as that of the first embodiment is produced by punching out from a non-oriented electrical steel sheet. First, as illustrated in FIG. 9A, a non-oriented electrical steel sheet 300 having random in-plane easy magnetization directions is prepared. As the non-oriented electrical steel sheet 300, commercially available products can be used. Subsequently, a core plate 9 having the same shape as that of the first embodiment having a core back 91 and teeth 92 is produced by punching from the non-oriented electrical steel sheet 300.

Figure 10:
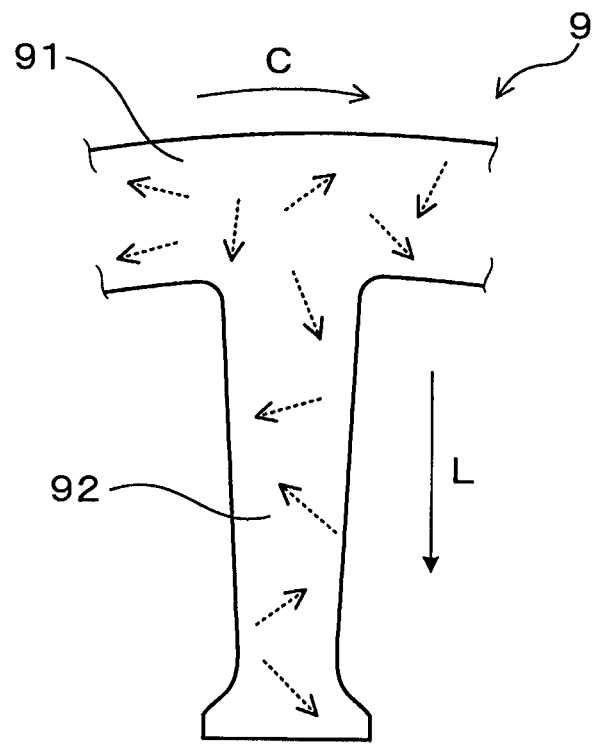
FIG. 10 is an enlarged view illustrating easy magnetization directions in a core plate according to at least one embodiment.

Since the core plate 9 is produced by punching the non-oriented electrical steel sheet 300, as illustrated in FIG. 10, the easy magnetization directions are random in both the core back 91 and the teeth 92. Therefore, magnetic properties in the teeth 92 are deteriorated as compared with the core plates 1 of the first to fourth embodiments described above having the easy magnetization directions parallel to the extending direction L of the teeth 92.

Fifth Embodiment

In the present embodiment, an embodiment in which a straining step is performed by roller flattening will be described. In the present embodiment, a core plate is manufactured similar to the first embodiment by sequentially performing a punching step, the straining step, a winding step and an annealing step.

Figure 11:
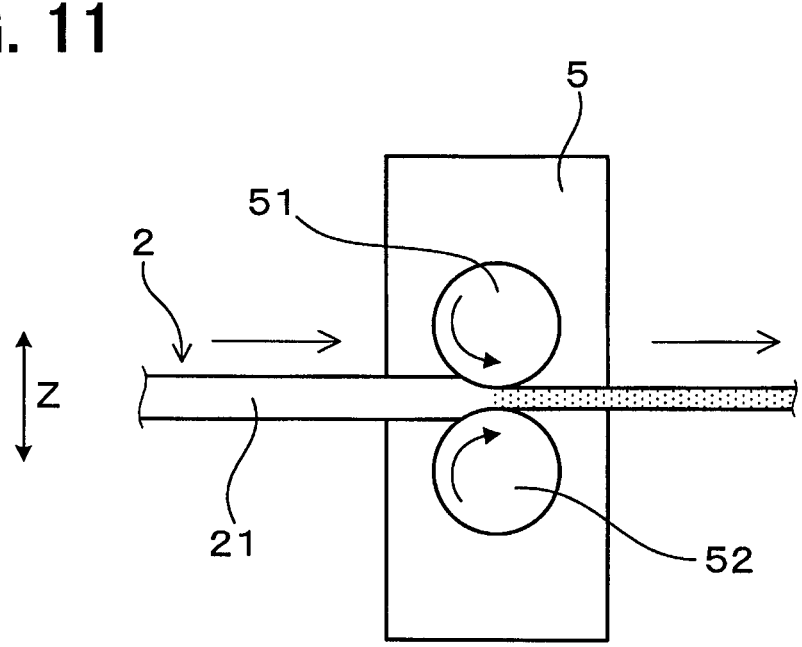
FIG. 11 is an explanatory view illustrating a straining step by roller flattening according to at least one embodiment.

First, similar to the first embodiment, a core sheet strip 2 having a band-shaped core back 21 and parallel teeth 22 is punched out (see FIGS. 1A and 1B). Next, as illustrated in FIG. 11, compressive strain in a plate thickness direction Z is applied to the band-shaped core back 21 of the core sheet strip 2 by roller flattening. That is, the band-shaped core back 21 of the core sheet strip 2 is sandwiched between a pair of rollers 51 and 52 of a rolling machine 5, and then rolling is performed to apply the compressive strain.

In the roller flattening, the compression strain can be applied sufficiently and uniformly to the band-shaped core back 21. As a result, the thickness of the band-shaped core back 21 becomes small, for example, it is processed into a uniform thickness. As illustrated in a later-described sixth embodiment, the thickness of the band-shaped core back 21 can also be inclined.

Figure 12:
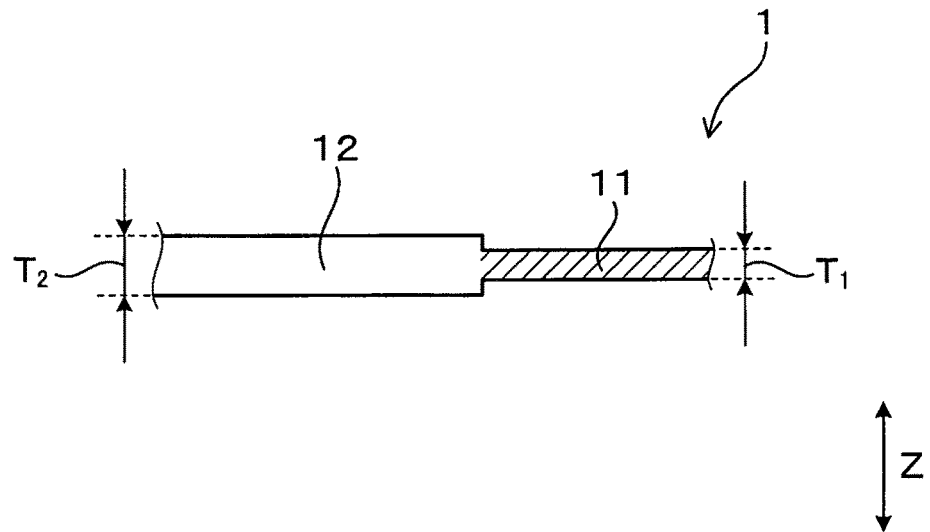
FIG. 12 is a partially enlarged sectional view illustrating a core plate according to at least one embodiment.

Next, similar to the first embodiment, the core plate 1 can be manufactured by performing the winding step and the annealing step. FIG. 12 illustrates an example of an enlarged sectional view of a boundary portion between the core back 11 and the teeth 12 in the core plate 1 obtained according to the present embodiment. Since the compressive strain has been applied to the band-shaped core back 21 by the straining step, the thickness T1 of the core back 11 is smaller than the thickness T2 of the teeth 12 as illustrated in FIG. 12. That is, T1<T2.

The thickness difference ΔT (unit: %) between the core back 11 and the teeth 12 is calculated by the following formula (I) from the thickness T1 of the core back 11 and the thickness T2 of the teeth 12.

$$\Delta T = (T2-T1) \times 100/T2 \quad (I)$$

The thickness difference ΔT between the core back 11 and the teeth 12 is preferably 5 to 20%. In other words, the compressive strain is preferably applied at the straining step so that the thickness difference ΔT between the core back 11 and the teeth 12 becomes 5 to 20%. In this case, magnetic flux density in the core back 11 of the core plate 1 can be further improved and the hysteresis loss can be further reduced, as shown in the experimental examples described later. As a result, the magnetic properties in the core back can be further improved. From the viewpoint of further improving the magnetic flux density in the core back, ΔT is more preferably 10 to 20%.

Experimental Example

In this example, compressive strain is applied to a test piece of a grain-oriented electrical steel sheet to prepare test pieces having different thicknesses, and magnetic properties of each test piece are evaluated. This is an example of examining a preferable range of a thickness difference between a core back and teeth.

First, a test piece having a length of 55 mm and a width of 55 mm is cut out from a grain-oriented electrical steel sheet similar to the first embodiment. The thickness of the test piece is 0.27 mm.

Subsequently, compressive strain is applied to the test piece by roller flattening at a predetermined rolling ratio. Accordingly, the test pieces having different thicknesses are prepared. A thickness change rate ΔTp (unit: %) was calculated by the following formula (II) from the thickness Tp1 of the test piece after rolling and the thickness Tp2 of the test piece before rolling.

$$\Delta Tp = (Tp2-Tp1) \times 100/Tp2 \quad (II)$$

In this example, test pieces having ΔTp of 0, 5%, 10%, 20% and 30% are prepared. A minimum thickness is used for the thickness of each test piece when the thickness has slope or variation. However, if there is a part whose thickness is extremely smaller than surroundings, that part is excluded. The thickness was measured using a micrometer M110-OM manufactured by Mitutoyo Corporation.

Next, each test piece is heated in the same manner and recrystallized by annealing similar to the first embodiment. Accordingly, a test piece as a model of the core back is obtained.

Next, the magnetic properties of the test piece are evaluated. Evaluation of the magnetic properties is carried out by measuring magnetic flux density and hysteresis loss in accordance with JIS C 2556 "Method for testing magnetic properties of electrical steel sheet", except that the shape of the test piece is a square of 50 mm×50 mm as described above. For the measurements, a magnetic property inspection device SK300 manufactured by Metron Giken Corporation is used.

Figure 13:
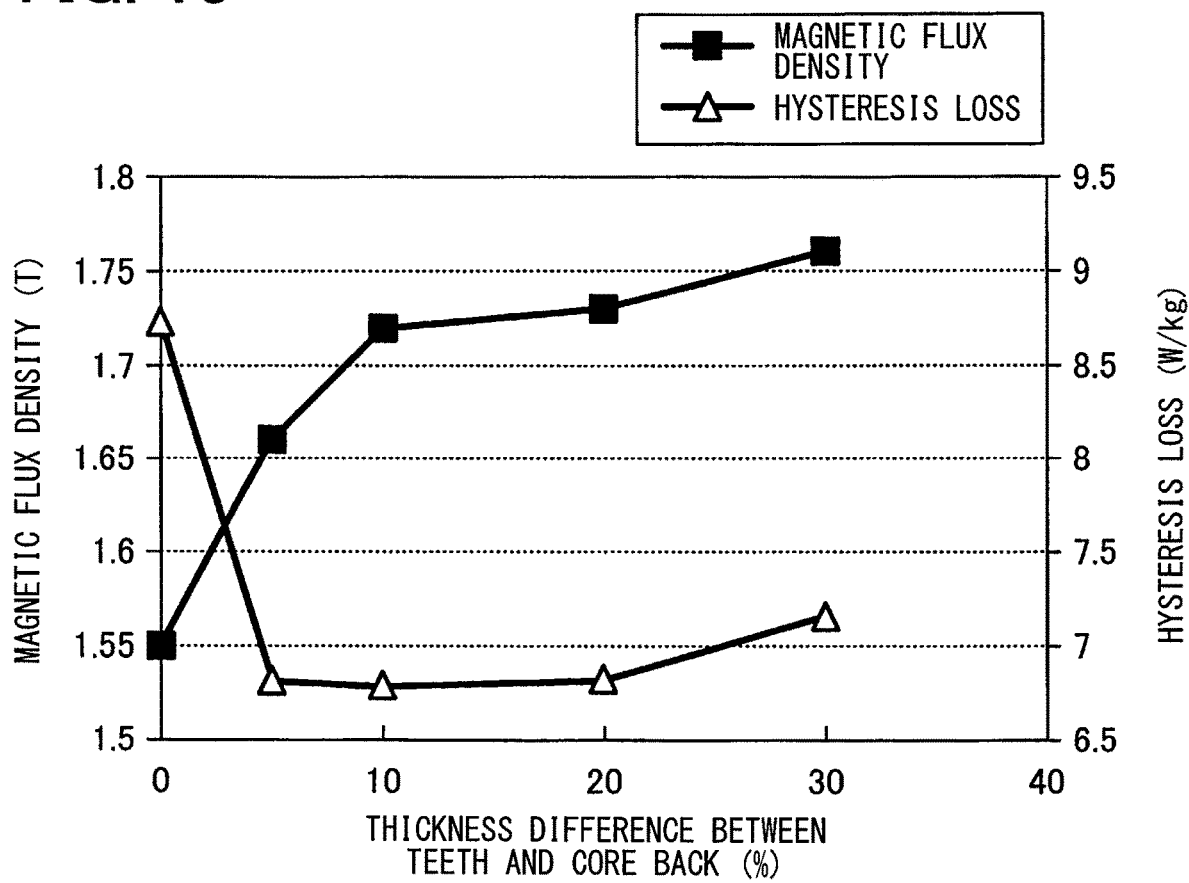
FIG. 13 is a graph showing a relationship between a thickness difference of a core back and teeth, a magnetic flux density at magnetic field H of 5000 A/m, and a hysteresis loss at magnetic flux density of 1.0 T and frequency of 400 Hz, according to an experimental example.

FIG. 13 shows a relationship between the thickness change rate ΔTp and a magnetic flux density at magnetic field H of 5000 A/m, and a relationship between the thickness change rate ΔTp of the thickness and a hysteresis loss at magnetic flux density of 1.0 T and frequency of 400 Hz. Since the thickness change rate ΔTp is synonymous with the thickness difference ΔT between the core back and the teeth in the fifth embodiment, FIG. 13 shows the thickness change rate as the thickness difference between the core back and the teeth. In the graph of FIG. 13, the horizontal axis shows the thickness difference between the core back and the teeth. The vertical axis on the left side shows the magnetic flux density when the magnetic field H=5000 A/m. The vertical axis on the right side shows the hysteresis loss at the frequency of 400 Hz and the magnetic flux density of 1.0 T.

As is known from FIG. 13, when the thickness difference between the core back and the teeth is 5 to 20%, the magnetic flux density can be further improved and the hysteresis loss can be further reduced. That is, in order to further improve the magnetic properties, the thickness difference between the core back and the teeth is preferably 5 to 20%. More preferably, the thickness difference is 10 to 20%.

As is known from FIG. 13, the magnetic flux density of the core back is preferably 1.65 T or more, more preferably 1.7 T or more, from the viewpoint of sufficiently enhancing the magnetic properties of the core plate. The hysteresis loss of the core back is preferably 7 W/kg or less.

In the present example, the preferable range of the above-described thickness difference ΔT is studied for the test piece to which rolling strain is applied by roller flattening, but similar results were obtained for other compressive-strain applying methods, such as forging, or various peening. However, from the viewpoint that rolling strain can be sufficiently applied, roller flattening and forging are more preferable.

Sixth Embodiment

In the present embodiment, an example will be described in which a tapered region is formed in a core back while simultaneously performing a straining step and a winding step. In also the present embodiment, a core plate is manufactured by a punching step, the straining step, the winding step, and an annealing step.

Figure 14A:
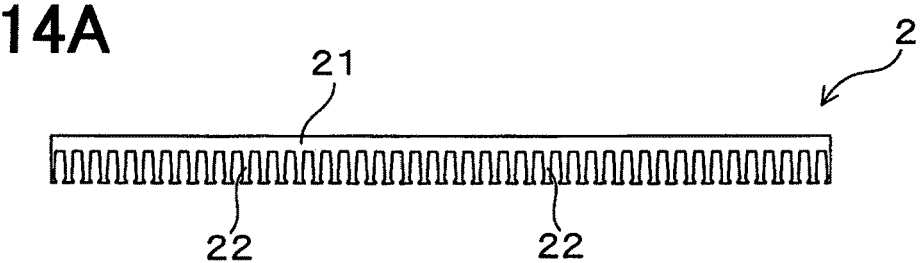
FIG. 14A is a view illustrating a core sheet strip according to at least one embodiment.

First, a punching step of a grain-oriented electrical steel sheet 3 is performed similar to the first embodiment, and accordingly, as illustrated in FIG. 14A, a core sheet strip 2 including a band-shaped core back 21 and a parallel teeth 22 is punched out. Next, the straining step and the winding step are performed in the same step.

Figure 14B:
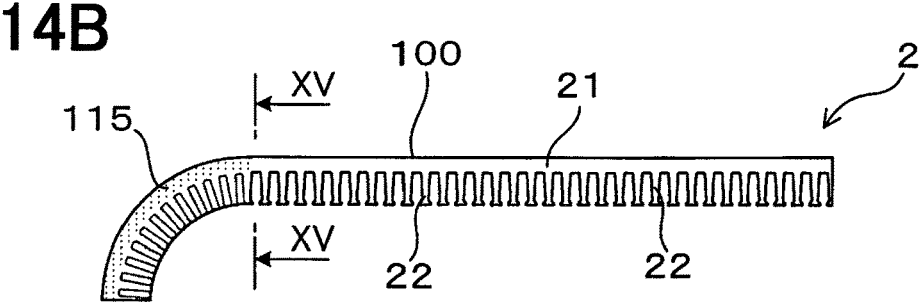
FIG. 14B is an explanatory view illustrating a core sheet strip being wound while applying compressive strain to a band-shaped core back according to at least one embodiment.

Specifically, as illustrated in FIG. 14B, compressive strain is applied to the band-shaped core back 21 of the core sheet strip 2 in the plate thickness direction Z, and at the same time, the core sheet strip 2 is sequentially wound in an annular shape with the parallel teeth 22 facing inward. According to this way, the application of the compressive strain to the band-shaped core back 21 and the winding of the core sheet strip 2 can be concurrently performed. The application of compressive strain can be carried out by, for example, roller flattening, similar to the fifth embodiment.

Figure 15:
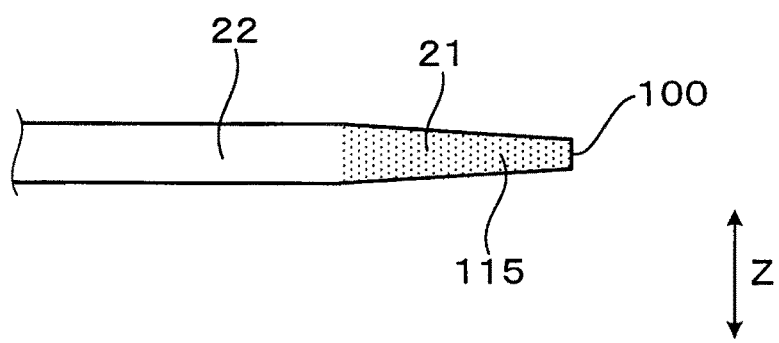
FIG. 15 is a sectional view taken along line XV-XV in FIG. 14B.

As illustrated in FIG. 15, at the straining step by roller flattening, a tapered region 115 in which the plate thickness is inclined can be formed in the band-shaped core back 21.

The tapered region 115 is formed such that the thickness of the band-shaped core back 21 decreases toward an outer edge 100 in a direction away from the teeth.

Figure 16:
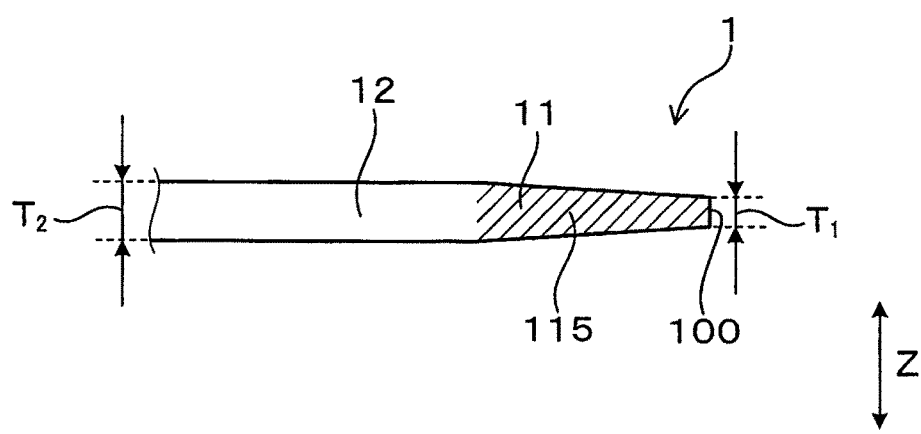
FIG. 16 is a partially enlarged sectional view illustrating a core plate according to at least one embodiment.

Next, similar to the first embodiment, the core plate 1 can be obtained by performing the annealing step. FIG. 16 illustrates an enlarged sectional view of a boundary portion between a core back 11 and teeth 12 in the core plate 1 of the present embodiment. As illustrated in FIG. 16, the core back 11 has the tapered region 115 whose thickness decreases outward from the center of the core plate 1. That is, in the tapered region 115, the thickness of the core back 11 decreases toward the outer edge 100, and the thickness of the core back 11 is inclined.

Since the tapered region 115 is formed in the core back 11 as in the present embodiment, the straining step and the winding step can be simultaneously performed as described above. Therefore, the manufacturing process can be shortened, and the productivity can be improved. In addition, in this case, the outer edge 100 of the band-shaped core back 21 is likely to stretch. Therefore, winding can be performed more easily. From this viewpoint, productivity is improved.

The tapered region 115 is not necessarily formed over the entire region of the core back 11 but is preferably formed over the entire core back 11 from the viewpoint of applying compressive strain and improving the magnetic properties of the core back 11.

Even in the case where the tapered region 115 is formed in the core back 11 as in the present embodiment, the thickness difference of the core back 11 with respect to the teeth 12 is preferably set to 5 to 20% as in the fifth embodiment and the experiment example. Even when the core back 11 has the tapered region 115, the thickness T1 of the core back 11 is defined by its minimum thickness. Therefore, the thickness T1 of the core back 11 in this case is the thickness of the outer edge 100 of the core back 11 as illustrated in FIG. 16.

The present disclosure is not limited to the respective embodiments described above, and various modifications may be adopted within the scope of the present disclosure without departing from the spirit of the disclosure. For example, in the first embodiment, the method by shot peening has been described as a compressing method, but it is also possible to perform other peening methods, forging or the like, and as in the fifth and sixth embodiments, roller flattening can also be performed. In addition, although the circular annular core plate has been described, a core plate having an elliptical annular shape or a polygonal annular shape such as a square annular shape, a hexagonal annular shape or the like can be produced.

A comparative example will be described below. A stator core used in a rotating electric machine such as a generator and a motor includes multiple annular core plates which are laminated and each has an annular core back and teeth. In order to achieve high performance such as miniaturization and high output in the rotating electric machine, it is desired to control an easy magnetization direction in a core plate made of electrical steel sheet. Specifically, it is preferable that the easy magnetization direction in the teeth extending toward the center of the annular core plate is aligned in the extension direction of the teeth, and the easy magnetization direction in the core back is aligned in the circumferential direction of the annular core plate.

The comparative example is a technology for manufacturing a core plate, in which a sheet strip having a core back and teeth is punched out from a grain-oriented electrical steel sheet having an easy magnetization direction in one direction, and then the sheet strip is wound into an annular shape. Accordingly, the core plate can be manufactured to have the easy magnetization direction of the teeth aligned along the extension direction of the teeth.

However, according to the study of the present inventor, the easy magnetization direction is aligned in one direction in the grain-oriented electrical steel sheet. Therefore, as in the comparative example, when the core plate is manufactured by punching out and then winding a sheet strip so that the easy magnetization direction of the grain-oriented electrical steel sheet is parallel to the extension direction of the teeth, the easy magnetization direction in the core back also becomes parallel to the extension direction of the teeth. As a result, the core back becomes difficult to be magnetized in the magnetic circuit of the stator core. That is, the magnetic properties in the teeth are good, but the magnetic properties in the core back may deteriorate.

In contrast to the comparative example, the present disclosure provides a method for manufacturing a core plate capable of improving magnetic properties in teeth and preventing deterioration of magnetic properties in a core back.

One aspect of the present disclosure is a method for manufacturing a core plate having an annular core back and multiple teeth extending from the core back toward the center. The manufacturing method includes a punching step, a winding step, a straining step, and an annealing step. In the punching step, a core sheet strip is punched out from a grain-oriented electrical steel sheet which has an easy magnetization direction in a single direction on a sheet surface. The core sheet strip includes a band-shaped core back extending in a direction perpendicular to the easy magnetization direction, and parallel teeth extending parallel to the easy magnetization direction from the band-shaped core back. In the winding step, the core sheet strip is wound into an annular shape with the parallel teeth facing inward for obtaining the core plate having the core back and the teeth. In the straining step, compressive strain in a plate thickness direction is applied to the band-shaped core back of the core sheet strip or the core back of the core plate. In the annealing step, the band-shaped core back or the core back is annealed to be recrystallized after the applying of strain.

Another aspect of the present disclosure is a method for manufacturing a core plate having an annular core back and multiple teeth extending from the core back toward the center. The manufacturing method includes a straining step, a punching step, a winding step, and an annealing step. In the straining step, compressive strain in a plate thickness direction is applied to a band-shaped core-back region in a grain-oriented electrical steel sheet. The grain-oriented electrical steel sheet has an easy magnetization direction in a single direction on a sheet surface. The band-shaped core-back region extends in a direction perpendicular to the easy magnetization direction. In the punching step, a core sheet strip is punched out from the grain-oriented electrical steel sheet. The core sheet strip includes a band-shaped core back which has existed in the band-shaped core-back region, and parallel teeth extending parallel to the easy magnetization direction from the band-shaped core back. In the winding step, the core sheet strip is wound into an annular shape with the parallel teeth facing inward for obtaining the core plate having the core back and the teeth. In the annealing step, the band-shaped core-back region, the band-shaped core back or the core back is annealed to be recrystallized after the applying of strain.

In the manufacturing method of the present disclosure, the parallel teeth extending parallel to the easy magnetization direction of the grain-oriented electrical steel sheet is formed, and then a core sheet strip is wound annularly with the parallel teeth facing inward. Therefore, in the teeth, the easy magnetization directions can be aligned in a direction toward the center of the annular core plate.

In the above-described manufacturing method, the core back is recrystallized. Therefore, the easy magnetization directions of the grain-oriented electrical steel sheet can be made to be random. Therefore, the easy magnetization directions can be prevented from being along the extension direction of the teeth, that is, the direction toward the center of the core plate.

Originally, the desired direction of the easy magnetization direction in the core back is the circumferential direction of the annular core back. Therefore, when the direction perpendicular to the circumferential direction, i.e., the extension direction of the teeth is along the easy magnetization direction in the core back, the core back becomes difficult to be magnetized. According to the manufacturing method of the above-described aspect, the easy magnetization directions in the core back can be set to be random. Therefore, the easy magnetization directions parallel to the extension direction L of the teeth can be reduced in the core back. As a result, the magnetic properties in the core back can be further improved.

In the manufacturing method described above, the core back has undergone recrystallization by annealing after being applied compressive strain. Therefore, recrystallization easily occurs at the time of annealing, and recrystallization at low temperature and in a short time becomes possible. Therefore, at the annealing step, not only the core back, the band-shaped core back, or the core back region but also the core plate including the core back, the core sheet strip including the band-shaped core back, or the grain-oriented electrical steel sheet including the core back region can be heated. In other words, at the annealing step, even when the core plate, the core sheet strip, and the grain-oriented electrical steel sheet are heated, the core back, the band-shaped core back, or the core back region can be selectively recrystallized while preventing recrystallization of the teeth, the parallel teeth, or a teeth region that is to become the teeth in a subsequent step.

As described above, according to the above-described manufacturing method, the core plate can be obtained, which includes the teeth where the easy magnetization directions are along the extension direction of the teeth, and the core back where the easy magnetization directions are random. Therefore, according to the above-described aspect, the manufacturing method of the core plate can be provided, in which the magnetic properties in the teeth can be improved, and at the same time, deterioration of magnetic properties in the core back can be prevented.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A method for manufacturing a core plate having an annular core back and teeth extending from the annular core back toward a center, the method comprising:
    punching out a core sheet strip from a grain-oriented electrical steel sheet which has an easy magnetization direction in a single direction on a sheet surface, the core sheet strip including a band-shaped core back extending in a direction perpendicular to the easy magnetization direction, and parallel teeth extending parallel to the easy magnetization direction from the band-shaped core back;
    winding the core sheet strip into an annular shape with the parallel teeth facing inward for obtaining the core plate having the annular core back and the teeth;
    applying compressive strain in a plate thickness direction to the band-shaped core back of the core sheet strip or the annular core back of the core plate by shot peening, water jet peening, laser peening, or ultrasonic peening after the punching out step; and
    annealing the band-shaped core back or the annular core back to be recrystallized after the applying compressive strain, wherein
    the applying compressive strain occurs after the winding.

2. A method for manufacturing a core plate having an annular core back and teeth extending from the annular core back toward a center, the method comprising:
    applying compressive strain in a plate thickness direction to a band-shaped core-back region in a grain-oriented electrical steel sheet, the grain-oriented electrical steel sheet having an easy magnetization direction in a single direction on a sheet surface, the band-shaped core-back region extending in a direction perpendicular to the easy magnetization direction;
    punching out a core sheet strip from the grain-oriented electrical steel sheet, the core sheet strip including a band-shaped core back which has existed in the band-shaped core-back region, and parallel teeth extending parallel to the easy magnetization direction from the band-shaped core back;
    winding the core sheet strip into an annular shape with the parallel teeth facing inward for obtaining the core plate having the annular core back and the teeth; and
    annealing the annular core back to be recrystallized after the winding.

3. The method for manufacturing a core plate, according to claim 2, wherein the applying of strain includes shot peening, water jet peening, laser peening, ultrasonic peening, forging, or roller flattening.

4. The method for manufacturing a core plate, according to claim 1, wherein the applying of strain is performed so that a thickness difference in the plate thickness direction between the band-shaped core-back region, the band-shaped core back, or the annular core back and the teeth becomes 5 to 20%.

5. The method for manufacturing a core plate, according to claim 1, wherein the annular core back includes a tapered region whose thickness in the plate thickness direction decreases outward from the center.

6. The method for manufacturing a core plate, according to claim 4, wherein the thickness difference is more preferably 10 to 20%.

7. The method for manufacturing a core plate, according to claim 1, wherein the applying of strain is performed so that a thickness in the plate thickness direction of the core back is smaller than a thickness in the plate thickness direction of the teeth.

8. The method for manufacturing a core plate, according to claim 1, wherein the annular core back includes a tapered region whose thickness in the plate thickness direction decreases toward an outer edge of the annular core back in a direction away from the teeth.

9. The method for manufacturing a core plate, according to claim 1, wherein the applying of strain is performed so that when a thickness difference in the plate thickness direction between the annular core back and the teeth becomes 5 to 20%, a magnetic flux density increases and a hysteresis loss decreases.

\* \* \* \* \*